United States Patent [19]

Wakeman et al.

[11] Patent Number: 4,555,901

[45] **Date of Patent: * Dec. 3, 1985**

[54] COMBUSTION CHAMBER CONSTRUCTION

[75] Inventors: Thomas G. Wakeman; Harvey M. Maclin, both of Cincinnati, Ohio

[73] Assignee: General Electric Company, Cincinnati, Ohio

[ * ] Notice: The portion of the term of this patent subsequent to Nov. 6, 2001 has been disclaimed.

[21] Appl. No.: 316,532

[22] Filed: Dec. 19, 1972

[51] Int. Cl.[4] .................................................. F02C 7/20

[52] U.S. Cl. ...................................... 60/39.32; 60/757; 60/752

[58] Field of Search ................. 60/39.36, 39.65, 39.66, 60/39.69, 39.32, 752, 753, 754, 755, 756, 757, 758, 759, 760

[56] References Cited

U.S. PATENT DOCUMENTS

| | | | |
|---|---|---|---|
| 2,268,464 | 12/1941 | Seippel | 60/39.65 |
| 2,544,538 | 3/1951 | Mahnken et al. | 60/39.66 |
| 2,617,255 | 11/1952 | Niehus | 60/39.65 |
| 4,480,436 | 11/1984 | Maclin | 60/39.32 |

*Primary Examiner*—Stephen C. Bentley
*Attorney, Agent, or Firm*—Douglas S. Foote; Derek P. Lawrence

[57] ABSTRACT

A combustion chamber for use in gas turbine engines is provided with a liner formed of a high temperature material. The liner includes a plurality of panels of material mounted by means of a slideable, frictional mounting arrangement upon a high strength structural frame. As a result of this mounting arrangement, the liner is substantially isolated from structural forces associated with the combustion chamber, while the frame is substantially isolated from thermal stresses associated with the liner. Means are provided for positioning and securing individual panel members axially relative to the frame. The panels may be continuous annular bodies, or may be circumferentially segmented. In the latter case, means are provided for mounting individual panels in a slideable, frictional cooperation with laterally adjacent panels, as well as for sealing the abutting junctions. The individual liner panels may be easily removed for repair or replacement without disassembling the frame and associated components.

9 Claims, 5 Drawing Figures

COMBUSTION CHAMBER CONSTRUCTION

BACKGROUND OF THE INVENTION

The invention herein described was made in the course of or under a contract, or a subcontract thereunder, with the U.S. Department of the Air Force.

Related to this application are co-pending and concurrently filed cases, Ser. Nos. 316,441, 316,530, and Ser. No. 316,531 now U.S. Pat. No. 4,480,437 all filed Dec. 19, 1972 and assigned to the same assignee as the present application.

This invention relates to gas turbine engines and, more particularly, to combustion chambers for use therein.

Gas turbine engine efficiency is a function of various parameters, among them the temperature achievable within combustion chambers, as well as the amount of air which must be diverted to cool various elements of the engine. Contemporaneously, the structural integrity of an engine is improved if structural loads are carried by elements of the engine which elements are not also subjected to high temperatures and attendant thermal stresses.

In an attempt to raise achievable temperatures within combustion chambers, various materials and alloys have been proposed for use in the construction of the chambers. Two materials which exhibit particularly beneficial resistance to thermal effects are oxide dispersion strengthened materials and various ceramics. A major drawback of these and certain other high temperature materials, however, is that they are difficult or impractical to weld. This invention makes possible the use of these and other appropriate materials in the construction of combustion chambers.

The effective application of such high temperature materials as those discussed, in addition to enabling higher temperatures to be reached will also allow a reduction in the amount of cooling fluid required to be directed to the combustion chamber during operation. This reduction enables the engine to operate with increased efficiency.

Structural failures in gas turbine engines in the past have sometimes resulted from the subjection of structural load-bearing portions of the engine to thermal stresses associated with high temperatures of combustion. The formation of a combustion chamber in a way that requires the chamber liner (which is directly exposed to the heat of combustion) to carry structural loads associated with the combustion chamber has sometimes resulted in such failures. Use of the configuration of the present invention overcomes these problems by isolating the liner of the chamber from the structural loads associated with the frame encircling the chamber.

Another significant facet of the present invention is that it permits the easy removal of individual liner panels without the necessity of total disassembly of the structural frame and associated components. This, in turn, permits the substitution of new liner panels for those which may have become worn over extended use, or the repair of individual liner panels which retain a useful life. Such a capability proves a great cost saving with respect to prior art devices wherein combustion chambers have been formed of a substantially unitized construction and wherein damage or wear to a single portion of the chamber has necessitated replacement of large sections or the entirety thereof.

SUMMARY OF THE INVENTION

It is, therefore, a primary object of the present invention to provide a combustion chamber for use in gas turbine engines which provides improved structural integrity by providing independent elements for subjection respectively to thermal and structural stresses associated with a combustion chamber.

It is another object of the present invention to provide a combustion chamber for use in gas turbine engines wherein an improved liner formed of a plurality of panels provides easy and effective repair and replacement capability, and wherein improved liner materials can be utilized without the drawbacks of conventional fabrication.

These objects, and others which will become apparent from the detailed description hereinafter, are accomplished by the present invention in one form thereof by means of the use of a liner formed of a plurality of liner panels. The panels cooperate with one another and with a structural frame in a slideable, frictional cooperation facilitated by tongue and groove relationships properly dimensioned and disposed therebetween. Similar means are provided for effectuating a slideable, frictional retaining means for securing the panels in the axial direction with respect to the circumscribing structural frame. Likewise, similar means are provided for frictionally engaging and providing seals between laterally adjacent panels in situations where the panels comprise circumferentially segmented bodies.

The present invention is more particularly described in conjunction with the following drawings, wherein.

Figure 4:
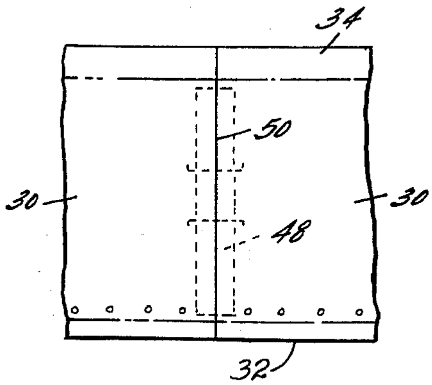
Figure 5:
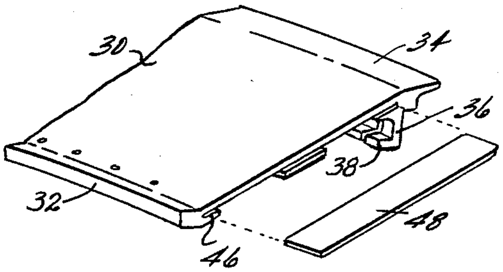

FIG. 4 further illustrates the lateral cooperation and sealing provisions for use with one embodiment of the present invention; and FIG. 5 more particularly discloses the seal and circumferential mounting arrangement of the embodiment of FIG. 4.

DESCRIPTION OF A PREFERRED EMBODIMENT

Figure 1:
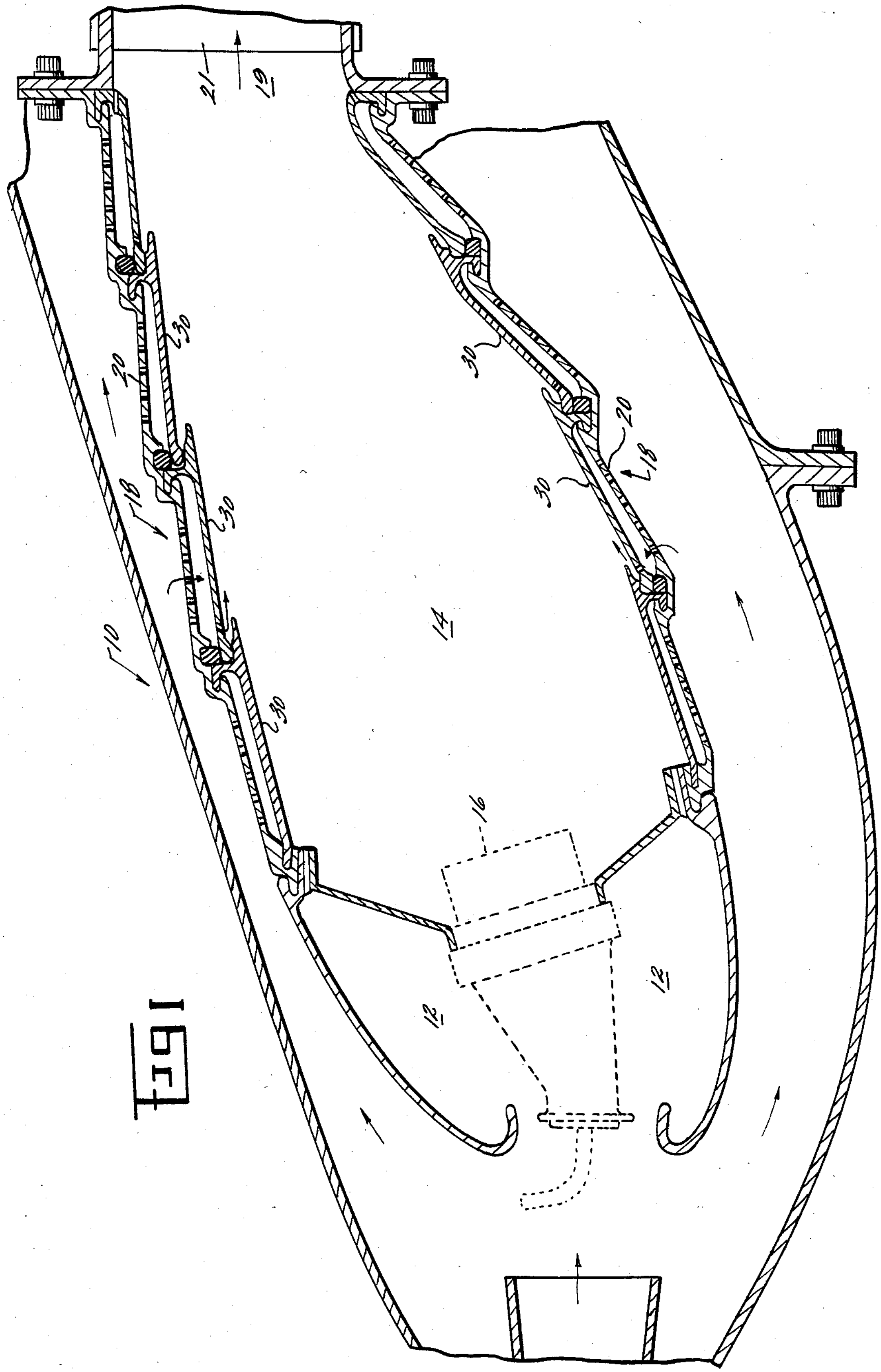
FIG. 1 is a simplified cross-sectional view of a combustion chamber of a gas turbine engine according to the present invention.
Figure 2:
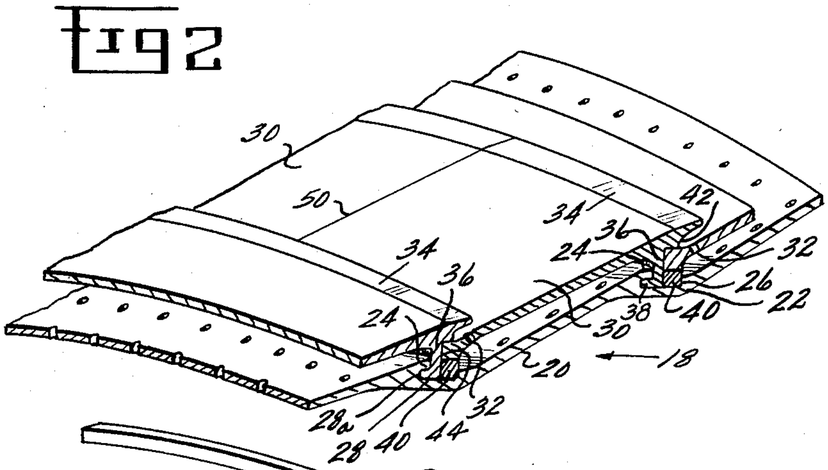
FIG. 2 illustrates the cooperation of liner panels, according to one embodiment of the present invention, with a structural frame.
Figure 3:
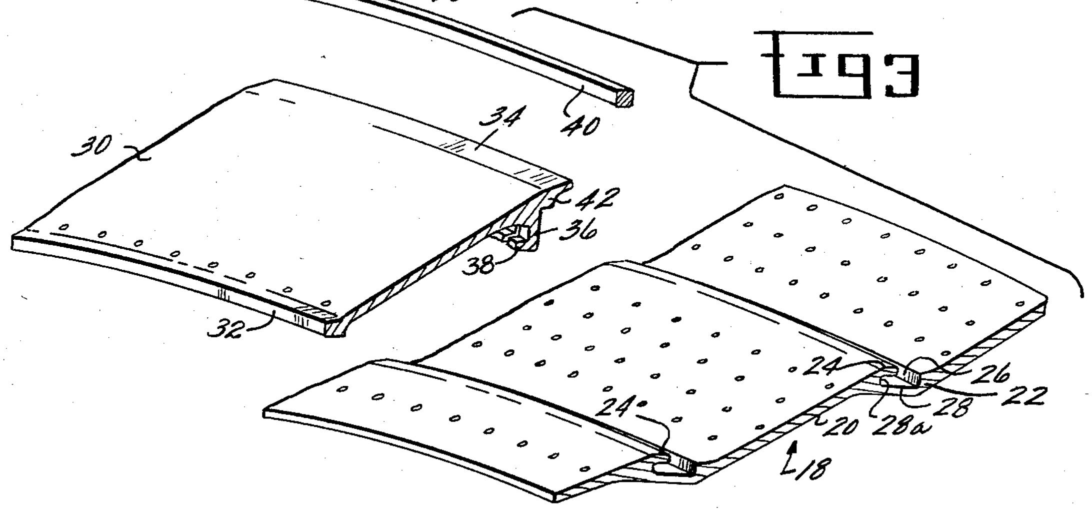
FIG. 3 depicts an exploded view of some of the elements of FIG. 2.

The combustion chamber depicted in FIG. 1 illustrates the basic elements of this portion of typical turbomachinery of its variety, as well as the substantial improvements characteristic of the present invention. As is well known in the art, atmospheric air enters the combustion chamber designated, generally as numeral 10, from the left through a fuel/air inlet 12 downstream of a high pressure compressor (not shown). The combustion chamber defines a combustion zone 14 and includes a fuel nozzle 16 disposed within inlet 12. A high strength frame 18, including a backing piece 20, circumscribes the combustion zone 14. In the typical fashion, fuel from nozzle 16 and air entering through the inlet 12 are mixed within combustion zone 14 wherein burning occurs. The products of combustion are expelled to the right in FIG. 1 through an outlet 19 and across a row of turbine blades 21. The turbine blades extract energy from the existing products of combustion and serve to operate a rotatable shaft which powers the upstream compressor. The remaining issuing flow of products of combustion produces a thrust to the left in FIG. 1.

The structure of the combustion chamber according to the present invention is more particularly disclosed with reference to FIGS. 2–5 as well as to FIG. 1. The frame 18 including backing piece 20 can be seen to incorporate a first radially extending shoulder 22 which includes a first axially extending flange 24 and a second flange 26 extending radially and partially defining a slot 28 within the frame. Slot 28 has a predetermined axial width and is characterized by cooperation with combustion chamber liner panels as hereinafter described.

According to a major object of the present invention, a plurality of individual combustion chamber liner panels 30 is provided, which panels cooperate with the structural frame 18 to complete the configuration of the combustion chamber. In order to facilitate the disposition of liner panels 30 about the structural frame, mounting means for positioning and securing the panels axially with respect to the frame are provided. The axial mounting means includes the shoulders 22 introduced hereinabove as well as the axial and radial flanges 24 and 26, respectively, of the frame 18. In addition, each panel 30, including a leading edge 32 and a trailing edge 34, carries a substantially radially extending shoulder 36 disposed near its trailing edge. Trailing edge retention of each panel is accomplished by the engagement of shoulder 36 with shoulder 22 in a substantially tongue and groove cooperation. More particularly, shoulder 36 includes a substantially axially extending flange 38 which may be inserted into the forward portion 28*a* of slot 28 in frame 18. In this position, flange 38 is overlapped and retained radially by means of flange 24 of the frame.

In order to secure flange 38 and associated shoulder 36 within slot 28, the present invention provides a continuous annular or circumferentially segmented retaining ring 40 for cooperation with these members and for disposition within slot 28. In order that the retaining ring 40 may be disposed within slot 28 in conjunction with flange 38, the axial width of flange 38 is smaller than the axial width of slot 28. Furthermore, the axial width of the retaining ring 40 may be dimensioned so that, upon disposition within slot 28 together with flange 38, the flange is retained within the slot in a frictionally slideable cooperation. Alternatively, the axial widths of the three elements may be selected so as to provide a substantially rigid retention of the flange within slot 28.

The choice of frictionally slideable cooperation between flange 38 and slot 28 or substantially rigid cooperation therebetween is provided, as stated, by the present invention. This flexibility is of substantial value in practical applications of the present invention. In a situation where the frictionally slideable cooperation is selected, this characteristic enables thermal expansion of individual panels 30 to occur without the imposition upon the structural frame of the forces and stresses attendant therewith. In other words, the structural frame is substantially isolated from the thermal stresses associated with the heat of combustion and its direct engagement of the panels 30. Likewise the liner panels 30 are isolated from structural stresses associated with the frame 18. On the other hand, if due to the operating circumstances surrounding an application of the present invention, it is not necessary to isolate the frame from possible liner thermal expansion (for the reason that this expansion is negligible), the dimensions of flange 38, retaining ring 40 and slot 28 may be selected to provide a rigid cooperation and retention of the flange and, hence, the associated panel. The operation of the frictionally slideable configuration is presented hereinafter.

Liner panels 30 are retained at their leading edges 32 by means of cooperation with a third flange 42 disposed near the trailing edge of preselected upstream panels. Flange 42 is formed as a thickened portion of the trailing edge 34 of each panel 30, and is positioned with respect to retaining ring 40 so as to form a recess 44 into which may be disposed a leading edge 32 of the immediately aft panel 30 as it is disposed in cooperation with frame 18. The dimensions of the leading edge and flange 42 are such as may provide a frictionally slideable or alternatively substantially rigid cooperation with the respective functional relationships described above.

The operation of the frictionally slideable mounting means illustrated above is similar both with respect to the leading and trailing edge mounting means. More particularly, thermal expansion in the axial direction of the panels 30 may serve to increase the length of the panels. This increase can be frictionally absorbed at the leading edge by means of the slippage of flange 42 relative to edges 32 or at the trailing edge by slippage of flange 38 in slot 28. Similarly, axial deflections of frame 18 due to the mechanical forces imposed thereon during chamber operation (e.g. aerodynamic forces) may cause deflection of the frame which deflection may be dissipated by frictional motion between these same elements. In such a fashion, the panels and frame are each respectively independent of the structural and thermal stresses imposed upon the other.

In terms of fabrication, the panels cooperate telescopically to form a combustion chamber. The axially foremost panels (disposed farthest to the left in FIG. 1) would be disposed in their axial positions first and subsequent panels 30 would be stacked axially aftward (or to the right) until the entire liner is fabricated. The aftmost panels are retained axially by contact with the turbine frame which is attached to backing piece 20, as shown.

During extended operation of the combustion chamber, individual panels may become worn or damaged requiring substitution therefor of new or repaired panels. By reversing the stacking procedure described, the damaged panels may be removed. To this end, the mounting means is releasable, permitting removal of the panels from the frame. This characteristic of the present invention provides ease of maintainability and extended life of liners without expensive machining repairs thereto.

Circumferentially, the individual liner panels 30 may be continuous annular bodies or alternatively may be circumferentially segmented and disposed in lateral abutting cooperation to form an annular body. The selection between these alternatives can be on the basis of ease of maintainability contemplating effectiveness of sealing techniques. The circumferential segmented alternative illustrated in FIGS. 2, 4 and 5, enhance inexpensive maintenance by providing smaller replaceable units. The continuous annular body panel, as illustrated in cross section in FIG. 1, reduces the number of seams presented to the high pressure of the combustion chamber and, hence, improves pressure retention and sealing characteristics.

Circumferentially segmented panels have another valuable characteristic in that they may be provided with the frictionally slideable cooperation with their adjacent panels similarly to such cooperation described above with respect to the axial mounting system. More particularly, circumferential thermal expansion of the panel segments 30 can be taken up by frictional sliding relative to one another rather than imposed as hoop stress upon the structural frame. To this end, FIGS. 4 and 5 illustrate the circumferential seals and mounting means which provide for pressure retention as well as for this frictionally slideable characteristic. These Figures disclose that adjacent panels 30 are provided with recesses 46 which complement one another when the panels are brought into circumferential abutment. Thin, elongated and substantially rectangular seals 48 are adapted to be disposed within adjacent recesses 46 in order to seal the junction 50 between laterally adjacent panels against the undesired escape of pressurized fluid from the combustion zone 14. The seals 48 may be dimensioned so as to make lateral motion between adjacent panels 30 possible but subject to frictional resistance. In other words, under particular types of loading, adjacent panels 30 could shift relative to one another circumferentially and seals 48 could move farther into or out of adjacent recesses 46, the motion being resisted by frictional engagement between recess 46 and seal 48. In this fashion, the frame and panels may be further isolated from the effects of thermal and structural stresses upon one or the other.

Alternatively, the seals and recessed may be so dimensioned as to provide a substantially rigid cooperation between adjacent panels. In either configuration, the present invention provides for easy removability of panels from their lateral cooperation with one another as well as from axial cooperation with the frame so that worn or damaged panels may easily be replaced or repaired.

This specification concludes with a number of claims to the present invention. However, it is apparent that those skilled in the art might make structural variations of the embodiments disclosed herein or equivalents therein without departing from the spirit of the invention. For example, frictionally slideable mounting arrangements equivalent in function to the configurations disclosed herein may be substituted therefor without departing from the spirit of the invention. Furthermore, other mounting systems having the removability features of the present invention would be also equivalent thereto. Such variations, as well as other equivalents, are intended to be covered within the scope of the appended claims.

What is claimed as new and desired to be secured by Letters Patent of the United States is:

1. A combustion chamber for use in gas turbine engines, the chamber comprising:

an inlet for receiving air and fuel to be burned;

an outlet for expelling products of combustion;

high strength structural frame means disposed between the inlet and the outlet for supporting mechanical forces associated with the chamber;

liner means cooperating with the frame means and defining a combustion zone, said liner means including a plurality of panels of high temperature material;

axial mounting means for positioning said panels axially with respect to said frame means, said axial mounting means including:

first shoulder means cooperating with preselected of said panels, and partially defining a circumferential slot of first predetermined axial width therein;

second shoulder means cooperating with the frame means;

a flange of predetermined second axial width less than said first width, said flange formed upon said second shoulder means for disposition within the slot; and a circumferentially extending retainer ring of predetermined third axial width suitable for disposition, together with said flange, within said slot.

2. The combustion chamber of claim 1 wherein said third width is such that said flange is retained within the slot in a frictionally slideable cooperation.

3. The combustion chamber of claim 1 wherein said third width is such that said flange is retained within the slot in a substantially rigid cooperation.

4. The combustion chamber of claim 1 wherein said retainer ring comprises circumferential segments.

5. A combustion chamber for use in gas turbines engines, the chamber comprising:

an inlet for receiving air and fuel to be burned;

an outlet for expelling products of combustion;

high strength structural frame means disposed between the inlet and the outlet for supporting mechanical forces associated with the chamber;

liner means cooperating with the frame means and defining a combustion zone, said liner means including a plurality of panels of high temperature material; and axial mounting means for positioning said panels axially with respect to said frame means, said axial mounting means including:

first shoulder means cooperating with preselected of said panels and partially defining a circumferential slot of first predetermined axial width therein; and second shoulder means cooperating with the frame means, wherein:

said second shoulder means includes a first flange for disposition within said slot, said first flange having a predetermined second axial width less than said first width; and said first shoulder means includes a second flange for overlying and retaining the first flange within the slot.

6. A combustion chamber for use in gas turbine engines, the chamber comprising:

an inlet for receiving air and fuel to be burned;

an outlet for expelling products of combustion;

high strength structural frame means disposed between the inlet and the outlet for supporting mechanical forces associated with the chamber;

liner means cooperating with the frame means and defining a combustion zone, said liner means including a plurality of panels of high temperature material; and axial mounting means for positioning said panels axially with respect to said frame means, said axial mounting means including:

first shoulder means cooperating with preselected of said panels; and second shoulder means cooperating with the frame means and engaging the first shoulder means, wherein:

said panels include leading and trailing edges, and preselected of said panels include edge flanges proximate their trailing edges for retaining cooperation with the leading edges of other preselected panels.

7. The combustion chamber of claim 6 wherein said panels cooperate telescopically to form said liner means.

8. A combustion chamber for use in gas turbine engines, the chamber comprising:

an inlet for receiving air and fuel to be burned;

an outlet for expelling products of combustion;

high strength structural frame means disposed between the inlet and outlet for supporting mechanical forces associated with the chamber;

liner means cooperating with the frame means and defining a combustion zone, said liner means including a plurality of circumferentially segmented panels, said panels adapted for disposition in lateral cooperation to form an annular body;

axial mounting mans for positioning said panels axially with respect to said frame means; and a plurality of seals disposed between preselected laterally adjacent panels;

and wherein said preselected panels include recesses along opposed edges for receiving said seals.

9. The combustion chamber of claim 8 wherein said recesses and said seals are dimensioned to provide a frictionally slideable cooperation.

* * * * *